(12) United States Patent
Wiggins

(10) Patent No.: US 6,913,138 B2
(45) Date of Patent: Jul. 5, 2005

(54) LOAD BEARING ASSEMBLY FOR A CONVEYING BELT AND A METHOD OF ASSEMBLING THE LOAD BEARING ASSEMBLY

(76) Inventor: Daniel Wiggins, 150 Huron Woods Dr., Marquette, MI (US) 49855

( * ) Notice: Subject to any disclaimer, the term of this patent is extended or adjusted under 35 U.S.C. 154(b) by 0 days.

(21) Appl. No.: 10/427,402

(22) Filed: Apr. 30, 2003

(65) Prior Publication Data

US 2004/0216987 A1 Nov. 4, 2004

(51) Int. Cl.$^7$ .............................................. B65G 15/62
(52) U.S. Cl. ...................................... 198/841; 198/823
(58) Field of Search ................................. 198/841, 823

(56) References Cited

U.S. PATENT DOCUMENTS

| | | | | |
|---|---|---|---|---|
| 4,932,516 A | * | 6/1990 | Andersson | 198/823 |
| 5,038,924 A | * | 8/1991 | Stoll | 198/823 |
| 5,103,967 A | * | 4/1992 | Stoll | 198/823 |
| 5,131,530 A | * | 7/1992 | Rappen | 198/841 |
| 5,368,154 A | * | 11/1994 | Campbell | 198/823 |
| 5,988,360 A | * | 11/1999 | Mott | 198/823 |
| 6,454,083 B2 | * | 9/2002 | Burkhart et al. | 198/823 |

* cited by examiner

*Primary Examiner*—Lesley D. Morris
*Assistant Examiner*—Mark A. Deuble

(57) ABSTRACT

A load bearing assembly for a conveying belt. The load bearing assembly has a main body for attachment to a support, and a support layer capable of being operably attached to the main body and having an exposed bearing surface to act supportingly against a conveying belt. The main body has a first shoulder facing a first direction, with the support layer having a second shoulder facing oppositely to the first direction and confronting the first shoulder to prevent separation of the main body and support layer with the support layer operably attached to the main body.

45 Claims, 4 Drawing Sheets

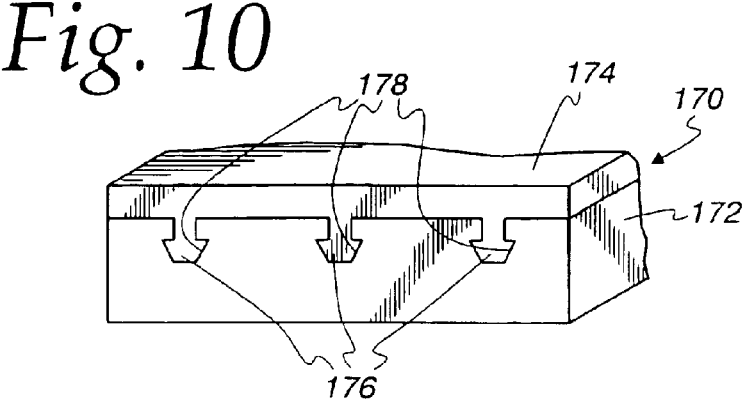
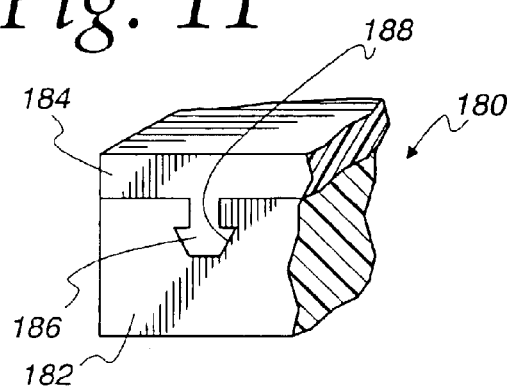
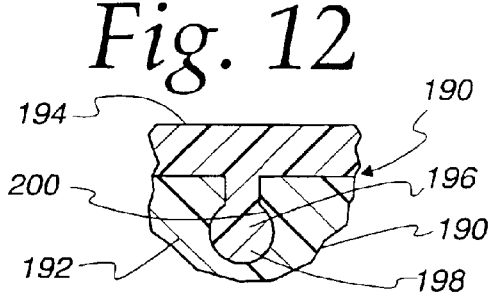
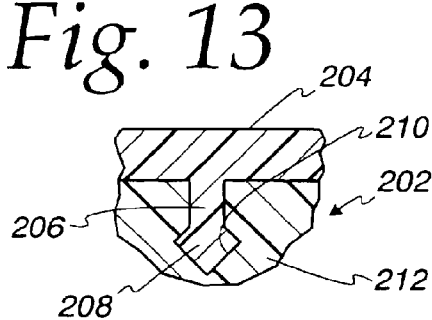
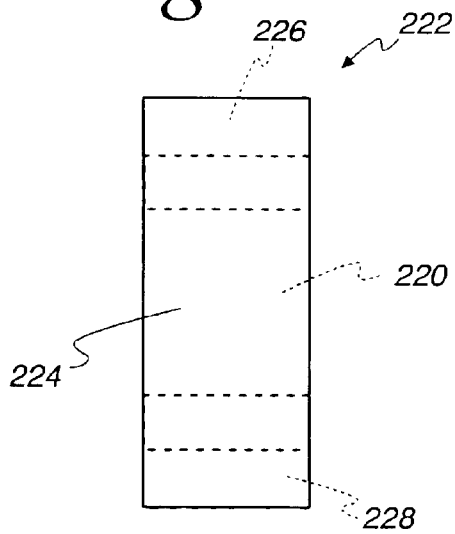

LOAD BEARING ASSEMBLY FOR A CONVEYING BELT AND A METHOD OF ASSEMBLING THE LOAD BEARING ASSEMBLY

BACKGROUND OF THE INVENTION

1. Field of the Invention

This invention relates to conveyor systems of the type having conveying belts trained around rollers to travel in prescribed paths to thereby transport material supported upon the conveying belt between first and second locations and, more particularly, to a load bearing assembly for contacting an unsupported portion of a conveying belt to absorb impact forces and support loads applied thereto. The invention is also directed to a method of assembling the load bearing assembly.

2. Background Art

A wide range of belt conveyor systems are currently being used in many diverse environments. One typical belt conveyor construction has an endless conveying belt which is trained around spaced head and tail pulleys for movement in a prescribed travel path. Material to be conveyed is loaded upon a conveying surface on the conveying belt along a portion of the path in which the conveying belt surface faces upwardly. The advancing conveying belt is capable of transporting material placed thereon from the region adjacent to the tail roller towards the region at which the head roller is located. In the region of the head roller, the transported material discharges, as to be accumulated at that location or transferred to another conveying component. Between the tail and head rollers, materials to be conveyed are placed upon the belt at one or more loading locations. Commonly, the material is dropped onto the conveying belt at the loading location. At the loading location, a suitable belt supporting structure is commonly employed. The supporting structure absorbs downward forces on the conveying belt to avoid excessive belt deformation and absorb impact, as might otherwise potentially damage the conveying belt at the loading location.

Supporting structures as described above have commonly incorporated discrete load bearing assemblies that are referred to as "impact bars." Designers of impact bars focus on a number of key functional aspects. Impact bars often encounter relatively high loads. If the impact bars are too rigid, applied loads may inflict damage on the conveying belt during loading. Excessive flexing of the impact bars is likewise undesirable in that this condition could likewise result in the infliction of damage to the conveying belt. Additionally, if there is excessive flex of the conveying belt, materials loaded upon the conveying belt may migrate off of the conveying belt and escape around confining skirting at the side boundaries of the conveying belt.

The impact bars must also exhibit good resistance to frictional wear. Under a load, the conveying belt may be continuously borne against the impact bar(s) as the conveying belt travels. Materials used to achieve the desired flexing qualities may not exhibit the required wear resistance. This could lead to frequent repair or reconstruction of the support structure. This repair/reconstruction may require a shut down of the entire conveyor system. As a result, the repair/reconstruction is detrimental not only from the standpoint of the expense directly associated with the repairs, but also from the standpoint of the loss of valuable operating time.

In this vein, it is also a goal of designers of these systems to facilitate the repair/reconstruction of the support structure. Given the severe conditions under which many of these conveyors are operated, regardless of the design of these conveyors, the support structures are prone to wear and failure over potentially a relatively short period of time. Accordingly, the objective of designers is to minimize down time and avoid direct expenses associated with repair/reconstruction of supporting structures.

In order to address the problems, noted above, several different structures have evolved in the industry. U.S. Pat. No. 4,793,470, to Andersson, and U.S. Pat. No. 5,074,407, to Brumby, disclose impact bars made with joined components. One of the components is designed primarily for impact absorption, whereas the other is designed to directly contact the conveying belt and is made from a material that has good resistance to frictional wear.

While the use of two different materials allows the designers to exploit the advantages of each, the industry has encountered problems with marrying different materials such as those used for the impact bars through adhesive or other chemical bonding. There has been a tendency of the joined parts to separate from each other.

Brumby also discloses impact bars which can be individually replaced, as necessary. This avoids the requirement to replace larger portions of the support structure.

Designers of impact bars for the conveying environment, and in other environments, are constantly looking for designs that contribute to more economical construction and repair, yet without sacrificing performance.

SUMMARY OF THE INVENTION

In one form, the invention is directed to a load bearing assembly for a conveying belt. The load bearing assembly has a main body for attachment to a support, and a support layer capable of being operably attached to the main body and having an exposed bearing surface to act supportingly against a conveying belt. The main body has a first shoulder facing a first direction, with the support layer having a second shoulder facing oppositely to the first direction and confronting the first shoulder to prevent separation of the main body and support layer with the support layer operably attached to the main body.

In one form, the main body has a third shoulder against which a mounting element can be borne to attach the main body to a support.

In one form, the main body has a length and the third shoulder extends continuously along the length of the main body.

The third shoulder may be defined by a slot in the main body. The slot may be defined by a mounting piece that is molded into the main body.

In one form, the main body is made from a non-metal material and the mounting piece is made at least partially from metal.

In one form, there is a first projection on one of the main body and support layer and a first receptacle for receiving the first projection on the other of the main body and support layer. One of the first and second shoulders is on the first projection, with the other of the first and second shoulders bounding the first receptacle.

In one form, the one of the first and second shoulders resides substantially within a first plane. At least a part of at least one of the main body and support layer is deformable to permit the first projection to be pressed into the receptacle to thereby operably attach the support layer to the main body by relative movement of the support layer and main body against and relative to each other along a line that is transverse to the first plane.

In one form, there are a second projection and second receptacle, one each on the main body and support layer. The second projection has a third shoulder, with the second receptacle bounded by a fourth shoulder. The third and fourth shoulders face oppositely to and confront each other to prevent separation of the main body and support layer with the support layer operably attached to the main body.

In one form, the first projection has a stem with an enlarged head on the stem. The enlarged head defines one of the first and second shoulders and a fifth shoulder. The first receptacle is bounded by a sixth shoulder. The fifth and sixth shoulders face oppositely to and confront each other to prevent separation of the main body and support layer with the support layer operably attached to the main body.

In one form, the first projection and the first receptacle have a complementary shape.

The second material may be harder than the first material.

In one form, the main body is a urethane material.

In one form, the main body is made principally from a first material, with the support layer being made principally from a second material that is different than the first material.

One or both of the main body and support layer may be made by either an extrusion or molding process.

In one form, the main body has at least one relief opening therein to facilitate compression of the main body under a load.

The relief opening may extend along a substantial length of the main body.

The invention further contemplates the above structure in combination with a support to which the main body is attached, and a conveying belt which is trained for movement in a prescribed travel path and having a portion which can be brought supportingly into contact with the load bearing assembly.

The invention is also directed to the combination of a) a conveying belt that is trained for movement in a prescribed travel path; b) a support; and c) a load bearing assembly, as described above, on the support.

The invention is further directed to a method of assembling a load bearing assembly for a conveying belt. The method includes the steps of: providing a main body for attachment to a support and having a first shoulder residing substantially in a first plane and facing a first direction; providing a support layer having an exposed bearing surface to support a conveying belt and a second shoulder; aligning the main body and support layer, each relative to the other, in a pre-assembly position wherein the second shoulder faces oppositely to the first direction; and relatively moving the main body and support layer, each against the other, along a line transverse to the first plane to thereby cause at least a part of at least one of the main body and support layer to be deformed so as to allow the first and second shoulders to move towards and eventually past each other into a position wherein the support layer is operably attached to the main body and the first and second shoulders confront each other to prevent separation of the main body and support layer.

The step of relatively moving the main body and support layer may involve using a mechanical assist device. The mechanical assist device may include a plate. In one form, the step of relatively moving the main body and support layer involves placing one of the main body and support layer on a support and moving the plate forcibly against the other of the main body and support layer.

In one form, there is a projection on one of the main body and support layer and a receptacle for receiving the projection on the other of the main body and support layer. The step of relatively moving the main body and support layer involves pressing the projection into the receptacle. The method may further include the step of reinforcing the projection as the projection is pressed into the receptacle.

The step of reinforcing the projection may involve placing an element against the projection as the projection is pressed into the receptacle and thereafter separating the element from the main body and support layer with the support layer operably attached to the main body.

BRIEF DESCRIPTION OF THE DRAWINGS

FIG. 10 is a view as in FIG. 1 of a modified form of load bearing assembly, according to the present invention;

FIG. 11 is a view as in FIG. 10 of a still further modified form of load baring assembly, according to the present invention;

FIG. 12 is a fragmentary, end view of a portion of a load bearing assembly, according to the present invention, including a main body and a support layer operably attached thereto using another form of projection and receptacle;

FIG. 13 is a view as in FIG. 12 of a still further modified form of projection and receptacle, according to the present invention; and FIG. 14 is a plan view of another form of load bearing assembly, according to the present invention, in the form of an enlarged pad.

DETAILED DESCRIPTION OF THE DRAWINGS

Figure 1:
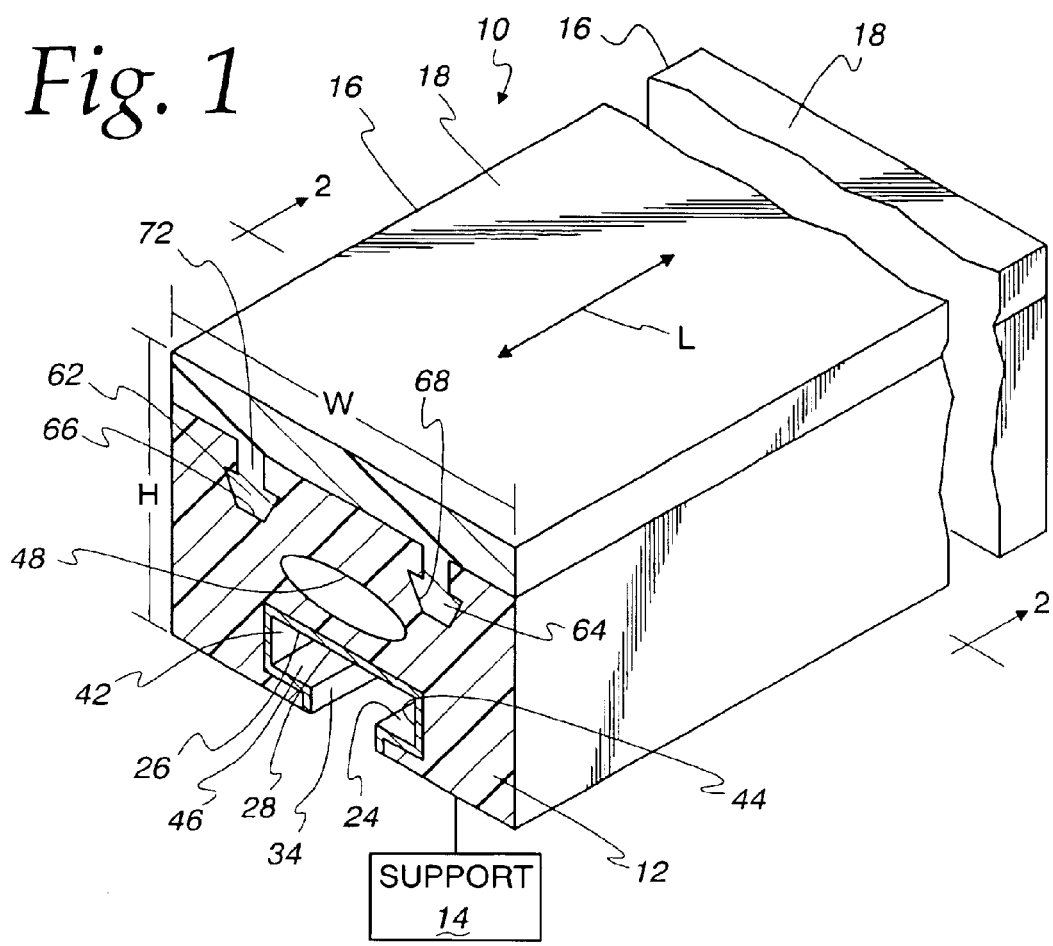
FIG. 1 is a partially schematic, perspective view of a load bearing assembly, according to the present invention, including a main body, attached to a support, and a support layer attached to the main body.
Figure 2:
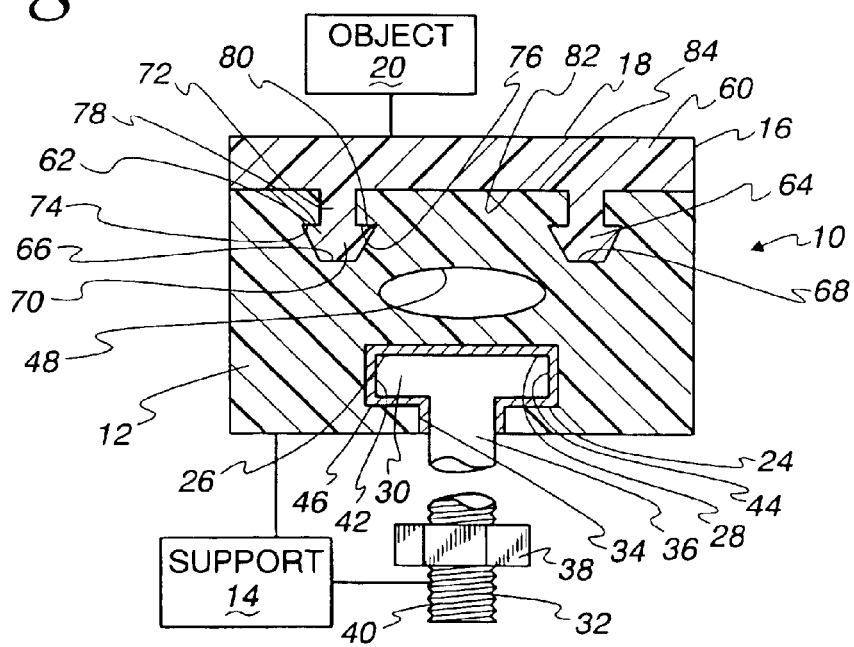
FIG. 2 is a cross-sectional view of the load bearing assembly taken along line 2—2 of FIG. 1.

One form of load bearing assembly, according to the present invention, is shown in FIGS. 1 and 2 at 10. This particular load bearing assembly 10 is built in a beam form with a length, as indicated by the double-headed arrow L, a width (W), and a height (H). The length, width, and height of the load bearing assembly 10 are dictated by the particular application, with that shown herein being merely exemplary.

The load bearing assembly 10 consists of a main body 12 for attachment to a support, shown schematically at 14. A support layer 16 is operably attached to the main body 12 and has an exposed bearing surface 18 to act supportingly against an object, shown schematically at 20 in FIG. 2.

The main body 12 is preferably made from a non-metal material, such as urethane, rubber, plastic, or the like. In a preferred form, the main body 12 is either molded or formed by an extrusion process. However, formation in different manners is likewise contemplated.

A mounting piece 24 is integrally molded into the main body 12. Preferably, the mounting piece 24 is made from metal, such as extruded aluminum. The mounting piece 24 defines a T-shaped channel 26, extending preferably the full length of the main body 12. The channel 26 has a main portion 28 that is generally rectangular in cross-section to accept a head 30 on a mounting bolt 32. The channel 26 has a reduced width portion 34 to accommodate a shank 36 on the mounting bolt 32. The channel portions 28, 34 are configured and dimensioned so that the mounting bolt head 30 and shank 36 can slide without significant hangup guidingly along the length of the channel 26. That portion of the mounting bolt shank 36 projecting from the channel 26 can be passed through the support 14 and secured by means of a nut 38 on a threaded portion 40 of the mounting bolt shank 36. The mounting bolt head 30 is preferably keyed between facing surfaces 42, 44 bounding the channel 26 against free rotation about the length of the bolt shank 36 so that the nut 38 can be tightened without holding the head 30.

With this arrangement, the mounting bolts 32 can be directed through the appropriate element on the support 14 in a loosened state. The main body 12 can then be slid over the mounting bolt heads 30 to the desired location. By then tightening the nuts 38, a base portion 46 of the mounting piece 24 will be drawn by the mounting bolt head 30 against the support 14 to fix the desired position of the load bearing assembly 10.

The nature of the main body 12 is such that it will afford a certain level of support, yet will flex in the direction of its height to absorb impact forces applied to the bearing surface 18. Urethane is preferred as a material from which the main body 12 is constructed in terms of its ability to provide both of these characteristics. To facilitate this vertical flexing, at least one relief 48 can be formed through the main body 12. This relief 48 preferably extends the full length of the main body 12, and provides a region within which the adjacent material of the main body 12 can collapse.

While the support layer 16 could be made from the same material as the main body 12, it is preferably made with a homogeneous construction from a different material to exploit that different material's characteristics. In one environment, as described in detail hereinbelow, the load bearing assembly 10 is used to support an element that is traveling along the bearing surface 18. Accordingly, it is desirable to provide a low friction material that has good resistance to frictional wear. For example, the support layer 16 might be made from a Teflon™ material, hard plastic, etc. With this construction, the load bearing assembly 10 can be made to exploit the firm but compressible nature of the material making up the main body 12, for impact absorption, and the more rigid, low friction, high wear resistance material making up the support layer 16.

According to the invention, the main body 12 and support layer 16 are united through a mechanical interconnection which might be augmented by an adhesive or other bonding structure. The support layer 16 is formed with a rectangular body 60 with laterally spaced, similarly configured projections 62, 64 extending in parallel, preferably the entire length of the main body 12. The projections 62, 64 are designed to be blockingly received in complementary receptacles 66, 68 formed in the main body 12. In this embodiment, the exemplary projection 62 has an enlarged head 70 projecting from a stem 72. With the support layer operably attached to the main body 12, first and second, generally planar, shoulders 74, 76 on the main body 12 and facing in a first direction, confront oppositely facing, generally planar, flat shoulders 78, 80 defined by the head 70, to thereby prevent separation of the support layer 16 from the main body 12. The cooperating parts may be dimensioned so that the shoulders 74, 76 abut to the shoulders 78, 80 with an inwardly facing surface 82 on the support layer body 60 abutted to an outwardly facing surface 84 on the main body 12. Alternatively, a slight spacing between the surfaces 82, 84 can be permitted without detrimentally affecting the performance of the load bearing assembly 10.

Figure 3:
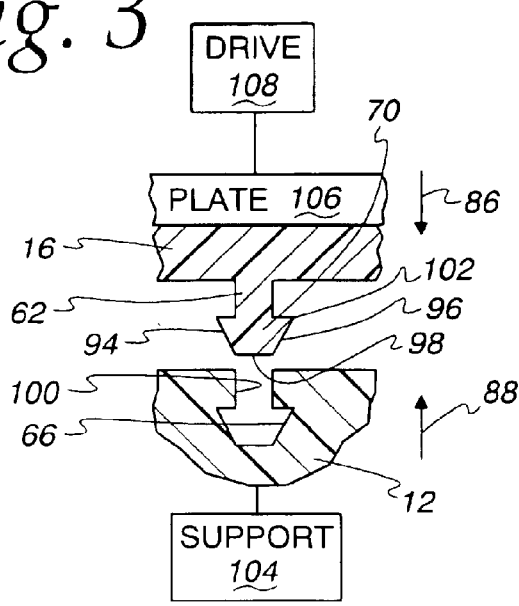
FIGS. 3–5 are partially schematic, fragmentary end views showing the sequence of connection steps between the projection and receptacle on the main body and support layer utilizing a drive plate.
Figure 4:
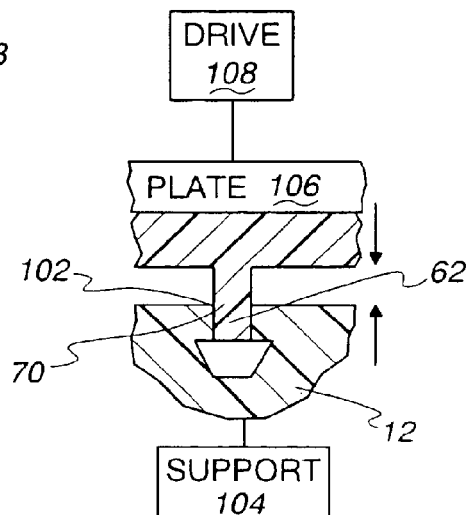

With this arrangement, the support layer 16, initially fully separated from the main body 12, can be operatively attached to the main body 12 by a press fit operation along a line generally orthogonal to the planes of the shoulders 74, 76, 78, 80. The interaction between the exemplary projection 62 and the main body 12 can be seen through the sequence of assembly steps shown in FIGS. 3–5. Initially, the main body 12 and support layer 16 are placed in a pre-assembly position, shown in FIG. 3, wherein the projection 62 aligns over the receptacle 66. By then moving the main body 12 and support layer 16 against each other along an assembly line, as indicated by the double-headed arrows 86, 88 in FIG. 3, the projection 62 can be forced into the receptacle 66. The head 70 on the projection 62 has side surfaces 94, 96 which converge to a leading edge 98. The side surfaces 94, 96 guide the head 70 initially through a neck portion 100 on the receptacle 66. Continued movement of the projection 62 into the receptacle 66 causes the larger, trailing portion 102 of the head 70 to be compressed laterally to permit passage thereof through the neck portion 100, as shown in FIG. 4. Once the head 70 clears the neck portion 100, the head 70 springs back toward its undeformed state, shown in FIG. 5, which results in the projection 62 being locked into the receptacle, with withdrawal thereof being confined by the cooperating shoulder pairs 74, 76 and 78, 80, as described above.

Figure 5:
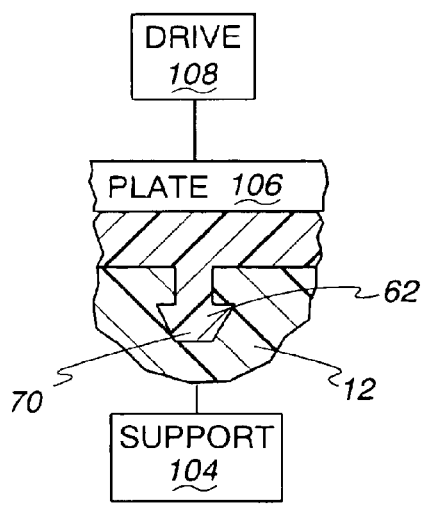

It is possible with the inventive structure to align the support layer 16 in the pre-assembly position with respect to the main body 12 and thereby drive the support layer 16 into place, as through the use of a hammer, or the like. More preferably, as shown in FIGS. 3–5, the main body 12 is held in a jig on a support 104. An elongate plate 106 can then be used to press the entire length of the support layer 16 towards the main body 12. Plate movement may be facilitated by a drive 108 that may be manually, hydraulically, or pneumatically operated to apply the necessary assembly force to the plate 106.

Figure 6:
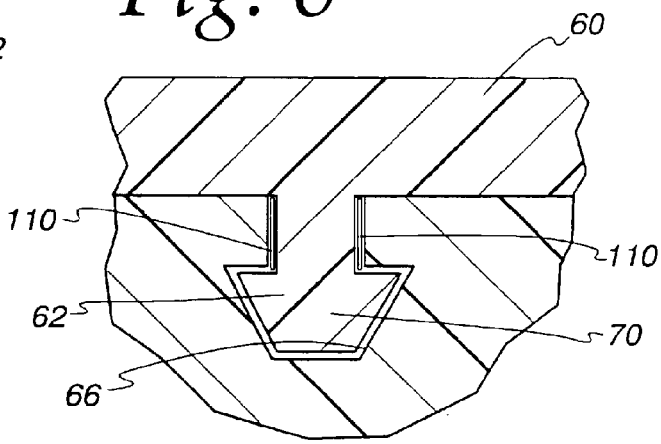
FIG. 6 is a view of the projection in the receptacle as in FIG. 5, with a reinforcing element utilized to prevent collapse of the projection during the process.

To avoid skewing of the projection 62 during this assembly process, one or more reinforcing elements 110 may be interposed between the head 70 and the body 60. The reinforcing elements 110 stabilize the position of the projection 62 under the applied assembly force. As seen in FIG. 6, the receptacle 66 can be made large enough to accommodate the reinforcing elements 110 which can be removed after the support layer is operably attached to the main body 12. FIG. 6 also shows that a relatively loose interfitting of the projection 62 within the receptacle 66 is permitted, which allows a certain amount of vertical play between the main body 12 and support layer 16 with the support layer operably attached to the main body.

Figure 7:
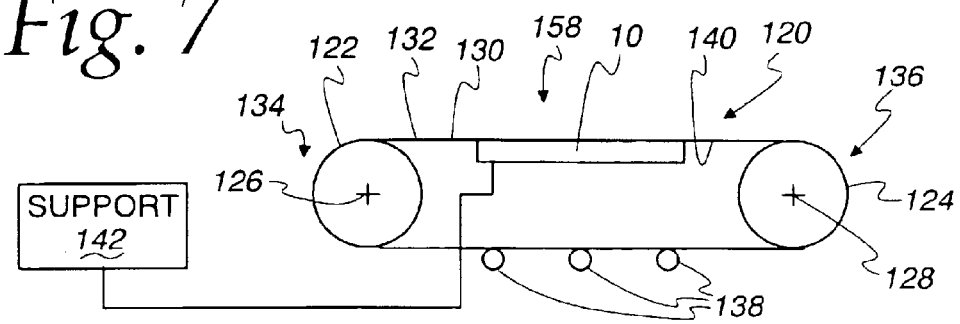
FIG. 7 is a schematic, side elevation view of a belt conveying system utilizing load bearing assemblies to support a belt thereon, according to the present invention.
Figure 8:
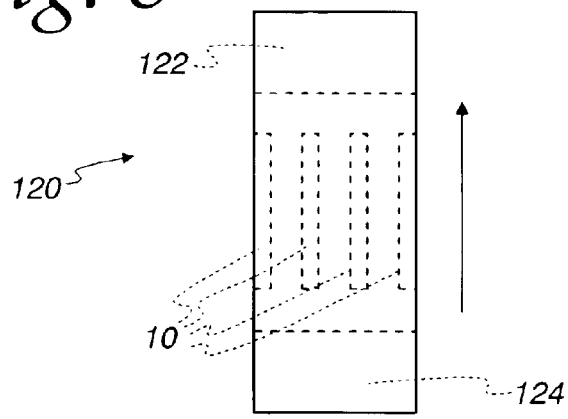
FIG. 8 is a plan view of the conveying system in FIG. 7.

One particular application for the load bearing assembly 10 is on a conveyor system, as shown at 120 in FIGS. 7 and 8. However, the load bearing assemblies 10 can be used in myriad different environments, both in static and dynamic applications. Briefly, the conveyor system 120 consists of a head roller 122 and a tail roller 124 rotatable about generally parallel axes 126, 128. A conveying belt 130 is trained around the rollers 122, 124 and has an upwardly facing surface 132 against which objects or material can be placed to be conveyed between spaced locations 134, 136 adjacent to the head and tail rollers 122, 124, respectively. Idler rollers 138 support the conveying belt in the return/lower portion of its travel path between the rollers 122, 124.

In this system 120, the load bearing assemblies 10 are mounted at the underside 140 of the conveying belt 130 between the rollers 122, 124 at the conveying portion of the travel path. The load bearing assemblies 10 can be mounted by means well known to those in the art in an operative position upon a support 142. In this embodiment, four load bearing assemblies 10 are shown in laterally spaced relationship. However, the number of load bearing assemblies 10 used depends upon the desired support, the dimensions for the load bearing assemblies 10, etc.

Figure 9:
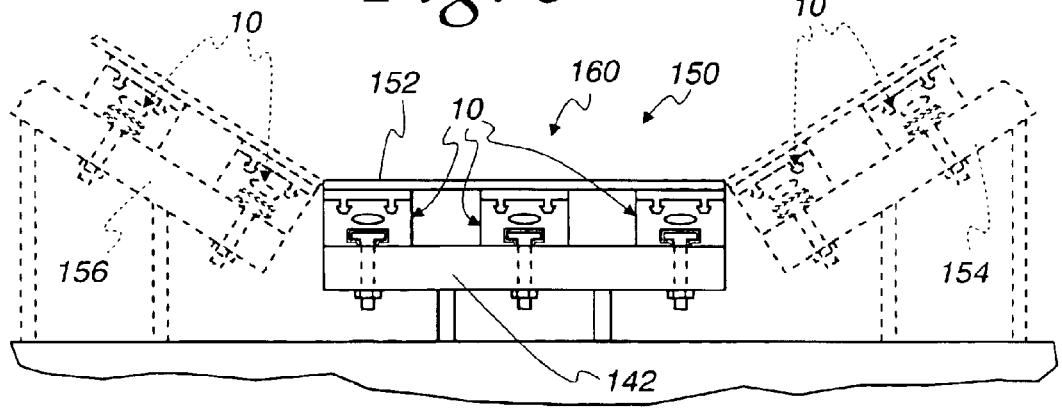
FIG. 9 is an end elevation view of a conveying system for a trough-shaped belt and incorporating load bearing assemblies, according to the present invention.

A slightly modified form of conveyor system is shown at 150 in FIG. 9. The conveyor system 150 incorporates the central elements of the conveyor system 120 and is, additionally, optionally modified to accommodate a trough conveying belt 152. To accommodate this belt 152, inclined, laterally spaced support elements 154, 156 are used. The support elements 154, 156 have additional load bearing assemblies 10 thereon in an inclined orientation so that a generally U-shaped support is defined for the conveying belt 152. In both conveying systems 120, 150, the load bearing assemblies 10 are located preferably in at least the loading regions 158, 160.

Other variations of the invention are contemplated. For example, in FIG. 10, the load bearing assembly 170 is shown with a main body 172 and support layer 174 joined by three laterally spaced projections on the support layer 174 cooperating with a like number of complementary receptacles 178 on the main body 172.

In FIG. 11, a load bearing assembly 180 consists of a main body 182 and a support layer 184 joined by a single projection 186 received in a receptacle 188.

In FIG. 12, a load bearing assembly 190 is shown with a main body 192 and support layer 194 joined by a projection 196 having a rounded, enlarged head 198 that fits in a complementary receptacle 200. The basic operating characteristics for this head shape are the same. While the cooperating shoulders between the head 198 and receptacle 200 are not flat, they are functionally the same and are treated herein as being effectively planar.

In FIG. 13, a load bearing assembly 202 is shown with a support layer 204 having a projection 206 with a head 208 that is generally diamond shaped in cross section to cooperate with a complementary recess 210 on a main body 212.

It should be understood that while the projections have been shown on the support layers and the receptacles on the main body in the embodiments herein, projections could likewise be on the main body, with the cooperating receptacles on the support layer. Alternatively, there could be a mixture of projections and receptacles on the support layer and main body.

Additionally, as shown in FIG. 14, another form of load bearing assembly 220 can be made in the form of an enlarged pad as opposed to an elongate beam. The load bearing assembly 220 is shown in an associated conveyor system 222 with a conveying belt 224 trained around head and tail pulleys 226, 228.

The foregoing disclosure of specific embodiments is intended to be illustrative of the broad concepts comprehended by the invention.

What is claimed is:

1. A load bearing assembly for a conveying belt, said load bearing assembly comprising:
    a main body for attachment to a support and having a flexible construction to absorb impact forces imparted thereto; and
    a support layer capable of being operably attached to the main body and having an exposed bearing surface to act supportingly against a conveying belt,
    the main body having a first shoulder facing a first direction and the support layer having a second shoulder facing oppositely to the first direction and confronting the first shoulder to prevent separation of the main body and support layer with the support layer operably attached to the main body.

2. The load bearing assembly for a conveying belt according to claim 1 wherein the main body has a third shoulder against which a mounting element can be borne to attach the main body to a support.

3. The load bearing assembly for a conveying belt according to claim 1 wherein the main body has a length and the third shoulder extends continuously along the length of the main body.

4. The load bearing assembly for a conveying belt according to claim 3 wherein the third shoulder is defined by a slot in the main body.

5. The load bearing assembly for a conveying belt according to claim 4 wherein the slot is defined by a mounting piece that is molded into the main body.

6. The load bearing assembly for a conveying belt according to claim 5 wherein the main body comprises a non-metal material and the mounting piece comprises metal.

7. The load bearing assembly for a conveying belt according to claim 3 wherein the main body has a length and the main body has at least one relief opening extending along a substantial length of the main body to facilitate compression of the main body under a load.

8. The load bearing assembly for a conveying belt according to claim 1 wherein there is a first projection on one of the main body and support layer that is formed as one piece with the one of the main body and support layer, there is a first receptacle for receiving the first projection on the other of the main body and support layer, and one of the first and second shoulders is on the first projection and the other of the first and second shoulders bounds the first receptacle.

9. The load bearing assembly for a conveying belt according to claim 8 wherein the one of the first and second shoulders resides substantially within a first plane, at least a part of at least one of the main body and support layer is deformable to permit the first projection to be pressed into the receptacle to thereby operably attach the support layer to the main body by relative movement of the support layer and main body against and relative to each other along a line that is transverse to the first plane.

10. The load bearing assembly for a conveying belt according to claim 8 wherein there are a second projection and second receptacle, one each on the main body and support layer, the second projection having a third shoulder and the second receptacle bounded by a fourth shoulder, the third and fourth shoulders facing oppositely to and confronting each other to prevent separation of the main body and support layer with the support layer operably attached to the main body.

11. The load bearing assembly for a conveying belt according to claim 10 wherein the first projection has a stem with an enlarged head on the stem, the enlarged head defining one of the first and second shoulders and a fifth shoulder, and the first receptacle is bounded by a sixth shoulder, the fifth and sixth shoulders facing oppositely to and confronting each other to prevent separation of the main body and support layer with the support layer operably attached to the main body.

12. The load bearing assembly for a conveying belt according to claim 8 wherein the first projection and first receptacle have a complementary shape.

13. The load bearing assembly for a conveying belt according to claim 1 wherein the main body is made principally from a first material, the support layer is made principally from a second material, and the first and second materials are different.

14. The load bearing assembly for a conveying belt according to claim 13 wherein the second material is harder than the first material.

15. The load bearing assembly for a conveying belt according to claim 1 wherein one of the main body and support layer is made by one of an extrusion and molding process.

16. The load bearing assembly for a conveying belt according to claim 1 wherein each of the main body and support is made by one of an extrusion and molding process.

17. The load bearing assembly for a conveying belt according to claim 1 wherein the main body comprises a urethane material.

18. The load bearing assembly for a conveying belt according to claim 1 wherein the main body has at least one relief opening therein to facilitate compression of the main body under a load.

19. The load bearing assembly for a conveying belt according to claim 1 further in combination with a support to which the main body is attached and a conveying belt which is trained for movement in a prescribed travel path and having a portion which can be brought into contact with the load bearing assembly.

20. The method of assembling a load bearing assembly for a conveying belt according to claim 1 wherein the support layer has a homogeneous construction.

21. In combination:
  a) a conveying belt that is trained for movement in a prescribed travel path;
  b) a support; and
  c) a load bearing assembly on the support and situated so that the conveying belt can be brought into contact with the load bearing assembly to be supported thereby, the load bearing assembly comprising:
  a main body attached to the support and having a flexible construction to absorb impact forces imparted thereto; and
  a support layer capable of being operably attached to the main body and having an exposed bearing surface to act supportingly against the conveying belt,
  the main body having a first shoulder facing a first direction and the support layer having a second shoulder facing oppositely to the first direction and confronting the first shoulder to prevent separation of the main body and support layer with the support layer operably attached to the main body.

22. The combination according to claim 21 further comprising a mounting element and wherein the main body has a third shoulder against which the mounting element is borne to attach the main body to a support.

23. The combination according to claim 21 wherein the main body has a length and the third shoulder extends continuously along the length of the main body.

24. The combination according to claim 23 wherein the third shoulder is defined by a slot in the main body.

25. The combination according to claim 24 wherein the slot is defined by a mounting piece that is molded into the main body.

26. The combination according to claim 25 wherein the main body comprises a non-metal material and the mounting piece comprises metal.

27. The combination according to claim 23 wherein the main body has a length and the main body has at least one relief opening extending along a substantial length of the main body to facilitate compression of the main body under a load.

28. The combination according to claim 21 wherein there is a first projection on one of the main body and support layer that is formed as one piece with the one of the main body and support layer, there is a first receptacle for receiving the first projection on the other of the main body and support layer, and one of the first and second shoulders is on the first projection and the other of the first and second shoulders bounds the first receptacle.

29. The combination according to claim 28 wherein the one of the first and second shoulders resides substantially within a first plane, at least a part of at least one of the main body and support layer is deformable to permit the first projection to be pressed into the receptacle to thereby operably attach the support layer to the main body by relative movement of the support layer and main body against and relative to each other along a line that is transverse to the first plane.

30. The combination according to claim 29 wherein there are a second projection and second receptacle, one each on the main body and support layer, the second projection having a third shoulder and the second receptacle bounded by a fourth shoulder, the third and fourth shoulders facing oppositely to and confronting each other to prevent separation of the main body and support layer with the support layer operably attached to the main body.

31. The combination according to claim 30 first projection has a stem with an enlarged head on the stem, the enlarged head defining one of the first and second shoulders and a fifth shoulder, and the first receptacle is bounded by a sixth shoulder, the fifth and sixth shoulders facing oppositely to and confronting each other to prevent separation of the main body and support layer with the support layer operably attached to the main body.

32. The combination according to claim 28 wherein the first projection and first receptacle have a complementary shape.

33. The combination according to claim 21 wherein the main body is made principally from a first material, the support layer is made principally from a second material, and the first and second materials are different.

34. The combination according to claim 33 wherein the second material is harder than the first material.

35. The combination according to claim 21 wherein one of the main body and support layer is made by one of an extrusion and molding process.

36. The combination according to claim 21 wherein each of the main body and support is made by one of an extrusion and molding process.

37. The combination according to claim 21 the main body comprises a urethane material.

38. The combination according to claim 21 wherein the main body has at least one relief opening therein to facilitate compression of the main body under a load.

39. The method of assembling a load bearing assembly for a conveying belt according to claim 21 wherein the support layer has a homogeneous construction.

40. A method of assembling a load bearing assembly for a conveying belt, said method comprising the steps of:
- providing a main body for attachment to a support and having a first shoulder residing substantially in a first plane and facing in a first direction;
- providing a support layer having an exposed bearing surface to act supportingly against a conveying belt and a second shoulder;
- aligning the main body and support layer, each relative to the other, in a pre-assembly position wherein the second shoulder faces oppositely to the first direction; and
- relatively moving the main body and support layer, each against the other, along a line transverse to the first plane to thereby cause at least a part of at least one of the main body and support layer to be deformed so as to allow the first and second shoulders to move towards and eventually past each other into a position wherein the support layer is operably attached to the main body and the first and second shoulders confront each other to prevent separation of the main body and support layer.

41. A method of assembling a load bearing assembly for a conveying belt according to claim 40 wherein the step of relatively moving the main body and support layer comprises using a mechanical assist device.

42. The method of assembling a load bearing assembly for a conveying belt according to claim 41 wherein the mechanical assist device comprises a plate, and the step of relatively moving the main body and support layer comprises placing one of the main body and support layer on a support and moving the plate forcibly against the other of the main body and support layer.

43. The method of assembling a load bearing assembly for a conveying belt according to claim 40 wherein there is a projection on one of the main body and support layer, there is a receptacle for receiving the projection on the other of the main body and support layer, and the step of relatively moving the main body and support layer comprises pressing the projection into the receptacle.

44. A method of assembling a load bearing assembly for a conveying belt, said method comprising the steps of:
- providing a main body for attachment to a support and having a first shoulder residing substantially in a first plane and facing in a first direction;
- providing a support layer having an exposed bearing surface to act supportingly against a conveying belt and a second shoulder;
- aligning the main body and support layer, each relative to the other, in a pre-assembly position wherein the second shoulder faces oppositely to the first direction; and
- relatively moving the main body and support layer, each against the other, along a line transverse to the first plane to thereby cause at least a part of at least one of the main body and support layer to be deformed so as to allow the first and second shoulders to move towards and eventually past each other into a position wherein the support layer is operably attached to the main body and the first and second shoulders confront each other to prevent separation of the main body and support layer,
- wherein there is a projection on one of the main body and support layer, there is a receptacle fo receiving the projection on the other of the main body and support layer, and the step of relatively moving the main body and support layer comprises pressing the projection into the receptacle,
- the method further comprising the step of reinforcing the projection as the projection is pressed into the receptacle.

45. The method of assembling a load bearing assembly for a conveying belt according to claim 44 wherein the step of reinforcing the projection comprises placing an element against the projection as the projection is pressed into the receptacle and separating the element from the main body and support layer with the support layer operably attached to the main body.

* * * * *